United States Patent [19]

Johnson

[11] Patent Number: 4,562,014

[45] Date of Patent: Dec. 31, 1985

[54] METHOD AND DEVICE FOR IN-LINE MASS DISPERSION TRANSFER OF A GAS FLOW INTO A LIQUID FLOW

[76] Inventor: Dennis E. J. Johnson, 1025 Garfield Ave., Aurora, Ill. 60506

[21] Appl. No.: 645,400

[22] Filed: Aug. 29, 1984

Related U.S. Application Data

[63] Continuation-in-part of Ser. No. 450,365, Dec. 16, 1982, Pat. No. 4,491,551, which is a continuation-in-part of Ser. No. 325,817, Dec. 2, 1981, Pat. No. 4,382,866, which is a continuation-in-part of Ser. No. 213,829, Dec. 9, 1980, abandoned.

[51] Int. Cl.$^4$ .............................................. B01F 3/04
[52] U.S. Cl. ................................... 261/64 R; 261/76; 261/78 A; 261/DIG. 75
[58] Field of Search .......... 261/DIG. 75, 64 R, 78 A, 261/76

[56] References Cited

U.S. PATENT DOCUMENTS

| | | | |
|---|---|---|---|
| 1,491,057 | 7/1924 | Myers | 261/DIG. 75 |
| 2,762,202 | 9/1956 | Ponsar | 261/DIG. 75 |
| 3,146,195 | 8/1964 | Barardi | 210/169 |
| 3,256,802 | 6/1966 | Karr | 99/275 |
| 3,282,227 | 11/1966 | Nielsen | 103/271 |
| 3,710,549 | 1/1973 | Nichols et al. | 261/DIG. 75 |
| 3,774,846 | 11/1973 | Schurig et al. | 239/102 |
| 3,946,449 | 3/1976 | Mathis | 261/DIG. 75 |
| 3,960,175 | 6/1976 | Liepe et al. | 137/604 |
| 4,041,981 | 8/1977 | Davis et al. | 261/64 R |
| 4,042,510 | 8/1977 | Sullins | 261/DIG. 75 |
| 4,162,970 | 7/1979 | Zlokarnik | 261/DIG. 75 |
| 4,162,971 | 7/1979 | Zlokarnik et al. | 210/15 |
| 4,226,719 | 10/1980 | Woltman | 261/DIG. 75 |
| 4,244,821 | 1/1981 | Molvar | 261/DIG. 75 |
| 4,261,347 | 4/1981 | Spencer et al. | 128/66 |
| 4,292,259 | 9/1981 | Roth et al. | 261/123 |
| 4,369,115 | 1/1983 | Bauer | 261/64 R |
| 4,443,335 | 4/1984 | Gullace | 261/DIG. 75 |

FOREIGN PATENT DOCUMENTS

2027969 12/1970 Fed. Rep. of Germany ... 261/DIG. 75

Primary Examiner—Tim Miles
Attorney, Agent, or Firm—McWilliams, Mann, Zummer and Sweeney

[57] ABSTRACT

A method and device for the in-line dispersion transfer of a gas flow into a liquid flow for dispersing and diffusing ambient air and/or other oxidant gas or gases into a filtrate or other liquid flow, such as water, and at super saturation achieving rates, to provide for oxidation and/or coagulation treatment of the contaminants or other undesirable materials in the liquid, for chemical free, water purification purposes, in which the device involved is free of moving parts and comprises a T-fitting body defining in-line liquid inflow and outflow ends and a mounting section intermediate such ends, with the fitting body mounting between its said ends thereof a standpipe at the mounting section of same with the standpipe being exposed to a source of the gas to be dispersed into the liquid flow, and with the fitting body and the standpipe comprising an assembly for dispersing the gas into the liquid flow including Venturi action means for dispersing or diffusing the gas in the liquid, induced by the kinetic energy of the liquid flow through said fitting body. Both vacuum and pressure gas supply systems are disclosed.

15 Claims, 14 Drawing Figures

METHOD AND DEVICE FOR IN-LINE MASS DISPERSION TRANSFER OF A GAS FLOW INTO A LIQUID FLOW

CROSS-REFERENCE TO RELATED APPLICATIONS

This application is a continuation-in-part of my application Ser. No. 450,365, filed Dec. 16, 1982 (now U.S. Pat. No. 4,491,551, granted Jan. 1, 1985), which is a continuation-in-part of my application Ser. No. 325,817, filed Dec. 2, 1981 (now Pat. No. 4,382,866, granted May 10, 1983), which in turn is a continuation-in-part of my abandoned application Ser. No. 213,829, filed Dec. 9, 1980 (the entire disclosures of which are hereby incorporated herein by this reference).

My said applications Ser. Nos. 213,829 and 325,817 disclose an electrochemical system for liquid filtration which includes a special injector or dispersion device for dispersing and diffusing air or other oxidizing and/or solids coagulation inducing gas or chemical slurry into a conduit conveyed flow of the filtrate to provide for an annular froth flow, or foam like flow, of the fluid being inserted within the filtrate flow for effecting complete dissolving and homogenization, on a molecular basis, of the fluid being inserted within the water flow involved, for achieving maximum effectiveness of the treatment of the liquid that is being processed.

The subsequently filed application of myself and Scott J. Johnson, Ser. No. 403,801, filed Aug. 5, 1982, now abandoned, which is a continuation-in-part of our application Ser. No. 363,254, filed Apr. 1, 1982, now abandoned, discloses a system of water purification and method and apparatus therefor that provides for treating water, as for detoxification, descaling, sterilization, and general purification purposes, in which the treating agent employed is atmospheric oxygen in the ambient air. The invention there involved is concerned with a generator for providing ionized oxygen allotrope gas and a gas dispersing and diffusing arrangement for dissolving such gas in a conduit conveyed flow of the water being treated. The generator continuously moves an ambient air flow through same that processes the air to concurrently energy transform and ionize the atmospheric oxygen therein to form stable and highly energized oxygen allotrope ions in oxidant gaseous form that, together with the remainder of the ambient air flow involved, are conveyed to and are continuously applied to a conduit conveyed flow of the water being treated, for elimination by oxidation of the contaminants and other undesirable materials contained in the body of water being treated, by the oxygen allotrope ions, the remaining components of the air returning harmlessly to the atmosphere.

The present application is directed to the gas or chemical slurry injector or dispersing device of my said applications Ser. Nos. 213,829 and 325,817, and is also directed as well to improved and simplified air or other gas injection or dispersing devices that are likewise of the in-line flow type but are specifically suited for use with the simplified oxidant gas providing water purification equipment of the type disclosed in said applications Ser. Nos. 363,254 and 403,801, and specifically in connection with the simplified oxidant gas generator devices of the type in which the gas flow into and through the equipment is induced by convection, as distinguished from mechanically forced gaseous flow.

The disclosure of said application Ser. No. 403,801 is hereby incorporated herein in its entirety.

A principal object of the present invention is to provide for in-line flow dispersion diffusion and mixing, in a liquid flow, of air or other gas for treating the liquid, which dispersion, diffusion and mixing creates froth flow dissolving and homogenization characteristics, whereby the gas and liquid are thoroughly intermixed on a molecular basis for maximum effectiveness of the gas on the liquid being treated.

Another principal object of the invention is to provide devices and methods for uniformly and consistently achieving, with in-line flow, gas mixing, dispersion, and diffusion into a conduit conveyed liquid flow of water to be treated by the gas, which results in an annular froth flow type diffusion of the gas, on a molecular basis, within and about the liquid flow, for effectively dissolving the gas in the liquid at supersaturation rates, whereby the liquid flow, containing the treating gas fully dispersed throughout same, in a dissolved supersaturated state, is conveyed to the main body of water being treated, such as the water in a swimming pool or spa, or the water of a holding tank or the like that is used for domestic drinking and cleaning purposes, or for industrial-commercial water reclamation purposes, where the fully dissolved treating gas is available to act on the body of water being treated. Where the gas is of the oxidant type disclosed in my application Ser. No. 403,801, the entire body of the water is acted on by the incoming water flow that is supersaturated with ionized oxygen allotropes in a highly charged state.

Still other important objects of the invention are to provide injectors or diffusers, for in-line gas flow into liquid flow that involve no moving parts, that are composed of few and simple parts, that are easy to install, and that are long lived in use, reliable and consistent in operation, and that are applicable to a wide variety of operating conditions.

In accordance with the invention, a device and method for in-line dispersion and diffusion of, for instance, an oxidant gas flow into a conduit conveyed flow of water being treated, for effecting continuous dissolving of the gas in the liquid on a supersaturated basis, are provided, in which the device comprises a T-fitting defining in-line liquid inflow and outflow ends and a mounting section intermediate such fitting ends, with the fitting defining between its said ends a liquid flow passage that extends therethrough, and with the fitting having a standpipe mounted on same at its mounting section in sealed relation to same, with the standpipe being in fluid flow communicating relation to the fitting passage. The fitting has disposed in its said through passage a sleeve that is substantially centered therein with respect to the central axis of same and defines inner and outer annular side surfacings that extend longitudinally of the passage, with the sleeve itself defining fluid receiving and discharge ends at the respective ends of same.

The fitting is connected at its inflow end to conduiting providing a laminar flow of the water being treated, and the standpipe is connected to the source of gas to be dispersed into such water flow, which source of gas is preferably one of the ionized oxygen allotrope gas generators disclosed in said application Ser. No. 403,801. The laminar flow of the liquid longitudinally of the sleeve establishes at the discharge end of the sleeve an annular reduced or low pressure fluid homogenizing mixing zone. The device is arranged to convey the gas flow from the standpipe into annular relation with the sleeve discharge end whereby the gas flow at the sleeve discharge end is drawn or sucked into swirling mixing relation with the liquid flow 360 degrees about the annular mixing zone, and substantially uniformly thereabout, for froth flow mass dispersion transfer of the gas flow into the liquid where effective dissolving of the gas in the liquid is effected and on a supersaturation basis.

In one of the embodiments of the invention, the gas flow relative to the sleeve is within the sleeve and the liquid laminar flow is along the external side surfacing of the sleeve, with the standpipe being equipped with a gas flow injector head that provides for funneling of the gas in annular relation about and inside of the discharge end of the sleeve in substantially concentric relation with the said mixing zone.

In another embodiment of the invention, the gas injector or disperser is arranged so that the gas flow relative to the sleeve is externally of the sleeve and the liquid laminar flow through the fitting is within the internal side surfacing of the sleeve, with the sleeve being in the form of an elongate tube that is disposed concentrically of the T-fitting through passage, with the tube being anchored to the fitting adjacent its inflow end of same in daming relation thereabout whereby at this point the liquid flow proceeds through the tube bore and the gas flow is blocked off from the liquid flow. The tube extends through the T-fitting passage and into a nipple type fitting at the discharge end of the T-fitting to define a Venturi throat or orifice that is in annular relation about the discharge end of the tube, with the standpipe, the fitting and the tube defining a gas flow pooling chamber that is 360 degrees about the tube outer side surfacing, and that directly connects with the Venturi throat, with the gas flow from the pooling chamber being in annular relation about the Venturi throat or orifice involved at the tube discharge end at which the gas flow discharge is brought into the annular mixing zone for the gas froth flow mass transfer diffusion into the liquid flow that is passing from the locale of the injector device through suitable conduiting to, for instance, the main body of water of a swimming pool or spa that is being treated.

In yet another embodiment of the invention, the liquid inflow end of the T-fitting is connected to the standpipe on which is mounted a stack of superposed helical wire springs of circular configuration, with a pooling chamber being defined adjacent the base of the standpipe, and the standpipe, its circular spring stack, and the pooling chamber being enclosed by a liquid flow confining cover that is connected to a source of the gas to be dispersed in the liquid. The liquid flow is up through the standpipe and reverses at the standpipe discharge end, flowing in annular form 360 degrees about the standpipe exterior, through the coil spring stack into the pooling chamber, with the gas being dispersed or diffused in the liquid by a Venturi effect inducted by the kinetic energy of the liquid flow involved, and interaction with the wire springs.

Other objects, uses and advantages will be obvious or become apparent from a consideration of the following detailed description and the application drawings in which like reference numerals indicate like parts throughout the several views.

However, it is to be distinctly understood that the specific drawing illustrations provided are supplied primarily to comply with the requirements of the Patent Laws, and that the invention is susceptible of modifications and variations that will be obvious to those skilled in the art, and which are intended to be covered by the appended claims.

Figures 1, 2:
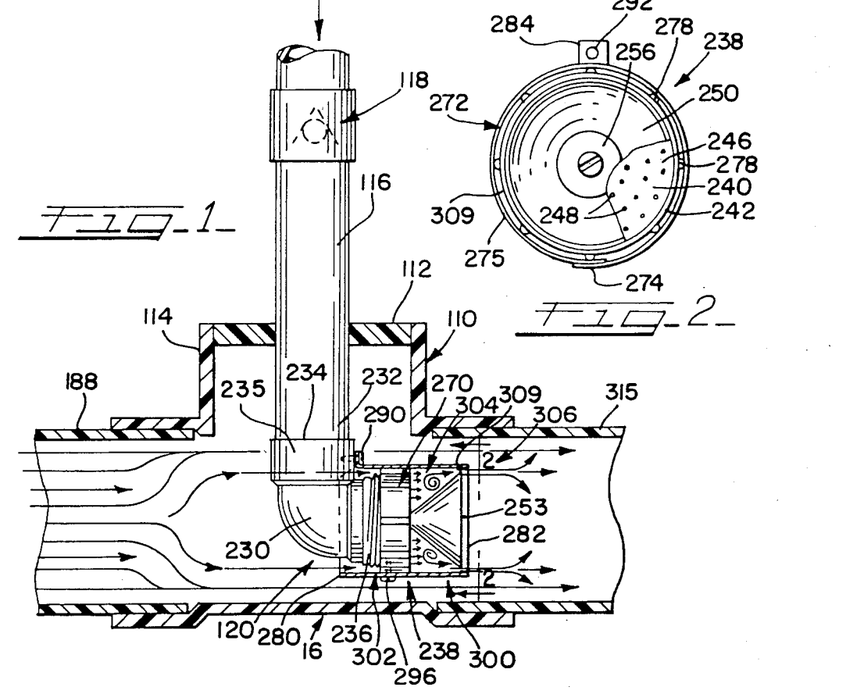
FIG. 1 corresponds to FIG. 7 of my said application Ser. No. 325,817 that illustrates one embodiment of the invention, with parts being shown partially in section and in elevation, and the liquid flow being illustrated diagrammatically by arrows to bring out the special nature of the injector device involved.
FIG. 2 is an elevational view of the discharge end of the injector of FIG. 1, taken substantially along line 2—2 of FIG. 1.
Figure 3:
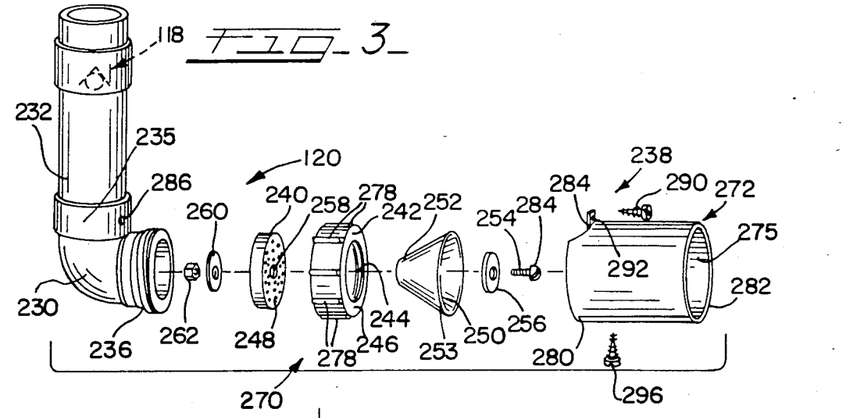
FIG. 3 is an exploded perspective view illustrating the basic components of the injector of FIGS. 1 and 2.

Referring first to the injector device 120 of FIGS. 1-3, the device 120 comprises suitable three way T-fitting 1!0 that is preferably formed from a suitable inert material, such as polyvinyl chloride (PVC), and that is joined at its inflow and outflow ends for suitable connection in leak free relation, at its respective inflow and outflow ends, to the respective conduits 188 and 315 through which the liquid to be treated flows in passing to and from the injector device 120. The fitting 110 includes in the form illustrated closure disc 112 that is suitably fixed across its upper end 114 and mounts in upright position standpipe 116 that has applied to same a suitable conventional check valve 118 that may be of one of the common spring biased ball types, to prevent liquid back flow through standpipe 116. The components just described are all conveniently formed from polyvinyl chloride, and are commercially available in standard components made from this material, which makes for ready shaping and assembly of the components to provide the assembly indicated. The securement of the fitting cover 112 to the fitting 110 and the securement of the conduits 188 and 315 to the fitting 110, as well as the securement of the standpipe 116 to closure disc 112, may be effected by employing a suitable standard plumber's bonding solvent for affixing PVC components and fittings, together in leak free relation. As is well known, PVC components are readily available in piping, fitting and disc form from a number of commercial sources.

In the arrangement of FIGS. 1-3, the injection or diffuser 120 is connected, by way of standpipe 116, to a source of gas, such as one of the compressor equipped oxidant gas generators of said application Ser. No. 403,801, which provides the ionized oxygen allotrope gas; such gas is believed to comprise hybrids of ionized ozone and/or singlet molecular oxygen ions (sometimes hereinafter called oxidant gas), as distinguished from neutral ozone, or ambient atmospheric oxygen, and is intended for application to the water disinfection, decontamination, descaling, and for general purification purposes, among other things. For this purpose standpipe 116, in the embodiment illustrated, extends through cover 112 to define depending end 232 that is disposed within fitting 110.

The device 120 further comprises elbow pipe element 230 suitably affixed to the depending end 232 of the standpipe 116, as by both of these components being formed from the aforementioned PVC piping and elbow components and bonded together at connection 234 in leak free relation, as by employing the aforementioned standard plumber's bonding solvent to bond pipe end 232 to elbow collar 235. Elbow 230 is formed to define threaded end portion 236 to which is applied the injector device mixer head assembly 238, the component parts of which are diagrammatically illustrated in FIG. 3 in exploded relation.

Thus, the mixer head assembly 238 comprises diffuser disc 240 that is seated within the collar 242, that is internally threaded as at 244 and formed with abutment flange 246 against which the diffuser disc 240 is seated, the diffuser disc 240 being suitably bonded or otherwise fixed in place against the flange 246 of collar 242 (diffuser disc 240 and collar 242 preferably being PVC parts of standard shape and appropriate size). The diffuser disc 240 is formed to define a plurality of apertures or orifices 248 for the passage of the gas or air supplied to the device 120, therethrough, and central bolt passing opening 258; as indicated in FIGS. 2 and 3, the apertures or orifices 248 are evenly distributed across the diameter of the disc 240, and preferably are sized to be approximately one thirty second inch in diameter for gas or air feed therethrough, it being desirable that they be equally spaced. Diffuser cone 250, which is preferably formed from stainless steel and is actually frustoconical in configuration, has its narrow end 252 anchored to diffuser disc 240 on its discharge side by screw 254 extending through washer 256, the end 252 of the diffuser cone, the central opening 258 of the diffuser disc, and washer 260, for threaded engagement with nut 262, with the nut 262 being turned onto the screw 254 to bring its head 264 against the washer 256 to firmly seat the latter within the diffuser disc 240 with the cone end 252 bearing firmly against the diffuser disc 240 about the aperture 258, and thus form diffuser subassembly 270.

The resulting diffuser disc, cone, and collar subassembly 270 are then applied to the threaded end 236 of the elbow 230, with the internal threading 244 of the collar 242 being threaded on the elbow end 236 for this purpose sufficiently to hold the subassembly 270 in fixed operating position.

Cooperating with subassembly 270 is the injector shroud 272, which in the embodiment of FIGS. 1-3 comprises a plate of stainless steel shaped to the cylindrical configuration indicated, with the overlapping ends of the plate being spot welded where indicated at 274. The shroud 272 is thus shaped to form cylindrical sleeve 275 that has an internal diameter that exceeds the external diameter of the collar 242 by a relatively small dimension, as indicated in FIG. 2, with the collar 242 being formed to define a plurality of spacer lugs 278 that are spaced apart about the collar periphery and are proportioned for forced application within the sleeve 275. The sleeve 275 defines intake end 280 and discharge end 282 as well as inner and outer annular side surfacings extending between said ends, with the end 280 of the sleeve 275 being force fitted onto the collar 242 and oriented so that the sleeve anchoring tab 284 is aligned with and disposed adjacent the aperture 286 of the elbow collar 235 for permitting the application of self tapping screw 290 through the tab aperture 292 and into the elbow aperture 286 (see FIG. 3) to fix the sleeve 275 in the mounted position thereof indicated in FIG. 1, wherein the sleeve 275 is centered within and concentrically located with respect thereto the through passage that is defined by the T-fitting 110. Self tapping screw 296 applied through the underside of the sleeve 275 into collar 242 completes the assembly of the device 120. The collar 242 is thus force fitted into the internal side surfacing defined by the sleeve 275. The subassembly, 270 and sleeve 275 are applied to elbow 230 before the latter is affixed to standpipe 116, the latter as a matter of practical application normally being in the form of a relatively short length of PVC tubing (suitably equipped with valve 118), for convenient application to filling 110 in the manner indicated, and later appropriate connection to conduiting that leads to the source of gas in question.

Assuming that the injector device 120 and associated components shown in FIG. 1 are incorporated in the electrochemical filtration system disclosed in my said application Ser. No. 325,817, or the injector device 120 and associated parts are incorporated in one of the compressor equipped water treatment systems disclosed in said application Ser. No. 403,801, and the water to be treated is passing through conduiting that includes conduiting 188 and 315, as part of the basic conduiting systems involved, the water flow pattern past and through the device 120 is indicated by the lines and arrows of FIG. 1, wherein it will be seen that the device 120, the liquid flow, and the arrangement of the mixer head assembly 238 and the sleeve 275 produce four distinct hydraulic flow pressure zones. Exteriorily of the sleeve 275 the water flows to the right of FIG. 1 along the external side surfacing of the sleeve 275 in a thin relatively quiescent zone 300. Within the sleeve 275, the water flows past the collar 242 in a relatively thin film, subdivided by the spacer lugs 278, in the embodiment illustrated, in a relative quiescent zone 302. At the discharge face of the diffuser disc 240, the gas being injected or diffused into the water flow enters a void space upstream of the diffuser cone 250 at a tubulent mixing zone 304. Downstream of the diffuser cone 250, about the margin of its larger end, and aligned with the discharge end of the sleeve 275, is a homogenizing liquid gas mix zone 306 of annular configuration and disposed in 360 degree relation about the through passage defined by the T-fitting 110 in centered relation therewith and with the sleeve 275.

On the liquid flow passing through the device 120, in operation of same, an annular fraction of the inline water flow enters into zone 302 within sleeve 275, which is in the nature of a lower pressure thin film zone. The gas to be injected or diffused in the liquid, which is applied to the standpipe 116 under pressure in accordance with this embodiment of the invention mixes turbulently with the thin water film leaving zone 302 and entering mixing zone 304, which produces a relatively high pressure turbulent mixing zone 304. The larger end 253 of the diffuser cone, which is spaced from the internal side surfacing of the sleeve 275 to define a relatively thin annular spacing 309 (see FIG. 2) which preferably approximately ⅜ths of an inch, provides for a funneling through such spacing of the liquid and gaseous components emerging from the mixing zone 304 into zone 306 to effect complete dispersion and homogenization of the gas within the passing liquid flow. The passing liquid flow around and exteriorily of the sleeve 275 at zone 300 tends to create a partial vacuum and thus low pressure area at zone 306 that is of annular configuration and is located, as previously indicated, immediately in front of the zone 304; the annular flow emerging from between the diffuser cone 250 and the sleeve 275 in concentric relation to the zone 306 is drawn or sucked to swirl up or out into the low pressure zone 306, thereby producing a turbulent mixing, dispersing, diffusing, and dissolving action of the gas into the liquid flow, thereby effecting complete homogenization of the gas within the water flow, and thus full or substantially full molecular saturation of the injected gas into the water flow, that produces the annular froth flow of the gas being diffused in the water that is contemplated by the present invention.

The sleeve 275, the diffuser cone 250, washers 256 and 260, screw 264, nut 272, as well as screws 290 and 296, are all preferably formed from stainless steel, with the other components of the device including standpipe 116 and fitting 110 being formed from the aforementioned polyvinyl chloride for corrosion resistance purposes. The securement together of the plastic parts involved that require leak free securement is conveniently effected using the aforementioned plumber's solvent, as already indicated. The pressure of the gas supplied to standpipe 116 is preferably in the range of from about 30 to about 40 psi, to provide a diffusion of the gas within the liquid at a rate within the range of from about 0.1 to about 1.0 cubic feet per minute, for the compressor equipped type generator of the type disclosed in said application Ser. No. 403,801.

Referring now to FIGS. 4–8, the gas injecting or dispersing device 22 is incorporated in an apparatus 310 (see FIG. 4) and arranged in accordance with applications Ser. Nos. 363,254 and 403,801 to provide for water treatment or processing for non chemical disinfection, descaling, detoxification, purification, and related purposes, in which the acting agent involved is gas comprising oxygen allotropes in ionized form, and which is obtained by the practice of the invention of said applications Ser. Nos. 363,254 and 403,801, pursuant to which embient air is cycled through the system generator and conduiting and into interspersed or diffused relation within the water to be treated, whereby atmospheric oxygen, to the exclusion of atmospheric nitrogen and other components of the air, is continuously transformed into the oxidant gas that serves as the oxidizing and/or coagulation agent, in accordance with the invention of said applications Ser. Nos. 363,254 and 403,801 (the disclosures of which are incorporated herein by this reference), and is continuously diffused into a conduit conveyed wall flow of the water being treated.

Figures 4, 4A, 5:
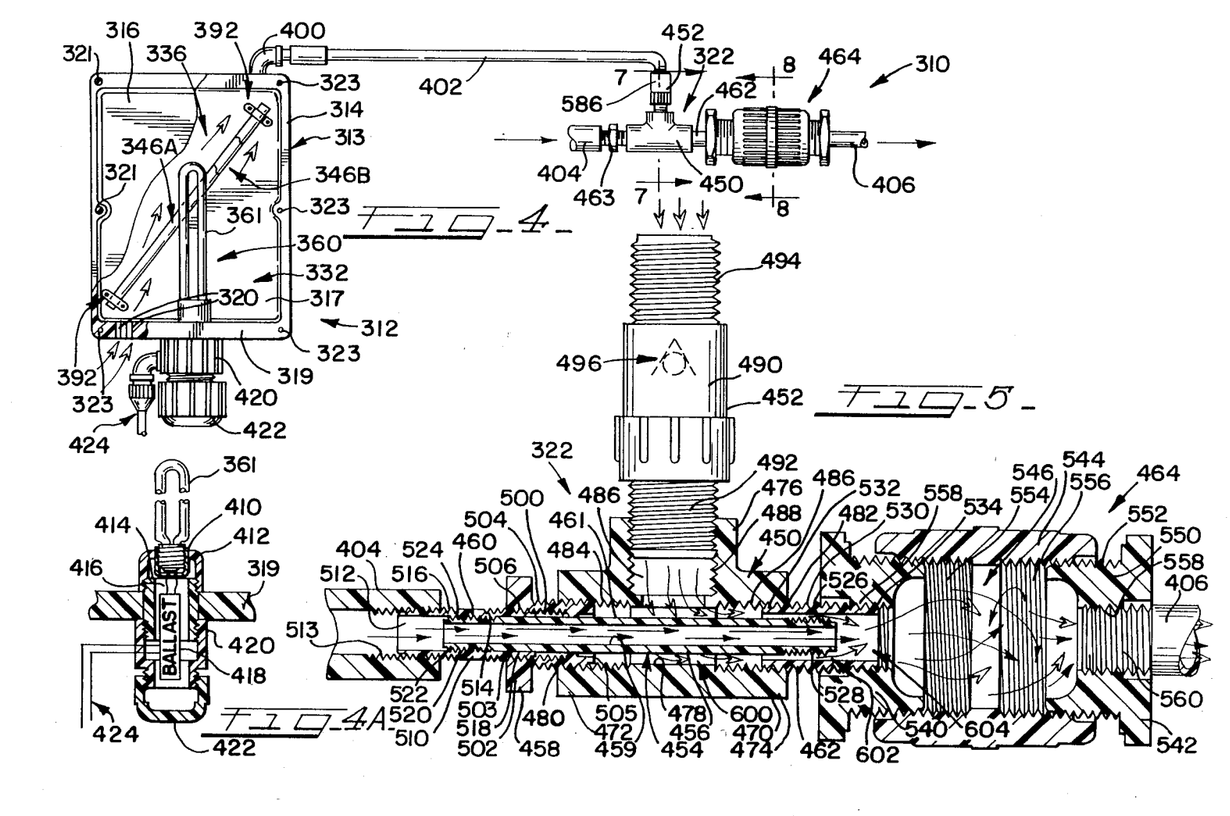
FIG. 4 is a diagrammatic plan view illustrating a simplification of one of the ionized oxygen allotrope gas generators of said application Ser. No. 403,801, and its connection to a conduit conveyed liquid flow of water being treated in accordance with the invention, which includes an inflow gas injector or dispersing device that forms another embodiment of the invention.
FIG. 4A is a fragmental sectional view of a portion of the generator shown in FIG. 4, diagrammatically illustrating the mounting in the floor of same of a suitable elongate ultraviolet electro-volt wave length activation energy electron-full emission lamp source that in cooperation with the permanent magnet devices of the generator, effects the energy transformation and ionization of the atmospheric oxygen passing through the generator, that provides the oxygen allotrope ions of the invention, which are involved in the gas flow that is injected into the liquid flow in accordance with the gas injectors or diffusers of the present invention.
FIG. 5 is an enlarged fragmental view of the injector or dispersing device of FIG. 4 and associated parts, with most parts being shown in vertical section, and the liquid and gas flows being illustrated by arrows of which those with solid heads represent liquid flow while those with hollow heads represent gas flow.
Figures 6, 7, 8:
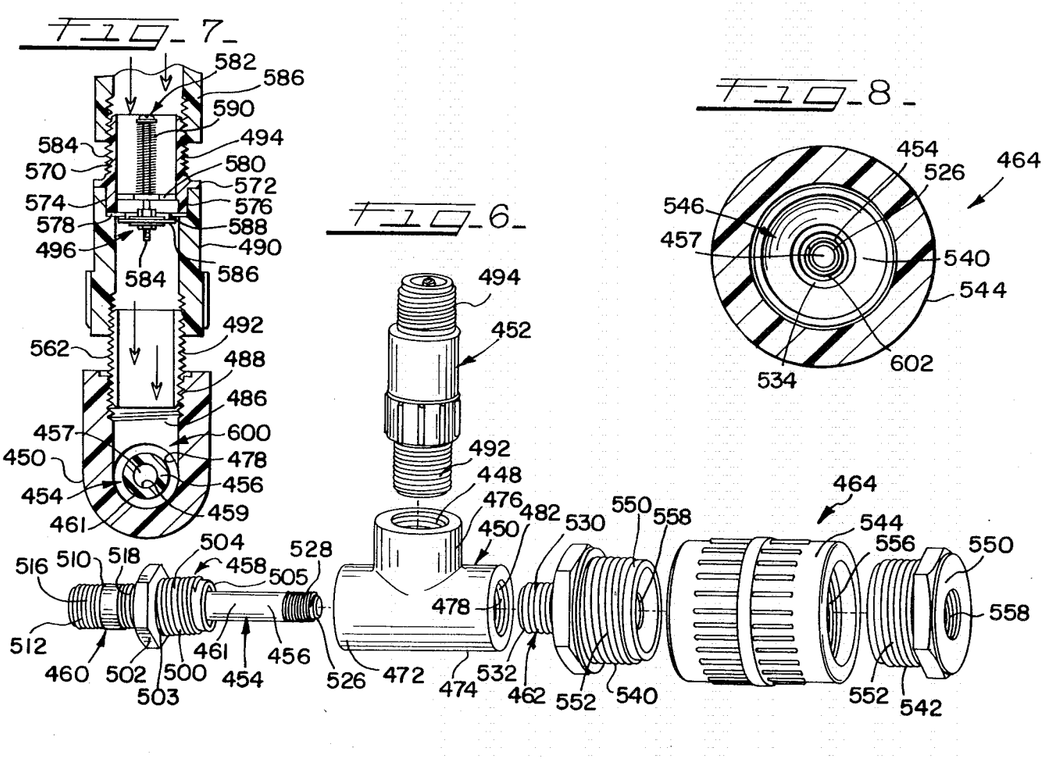
FIG. 6 is a diagrammatic exploded view of the component parts illustrated in FIG. 5.
FIG. 7 is a fragmental sectional view taken substantially along line 7—7 of FIG. 4.
FIG. 8 is a fragmental sectional view taken substantially along line 8—8 of FIG. 4.
Figures 9, 11:
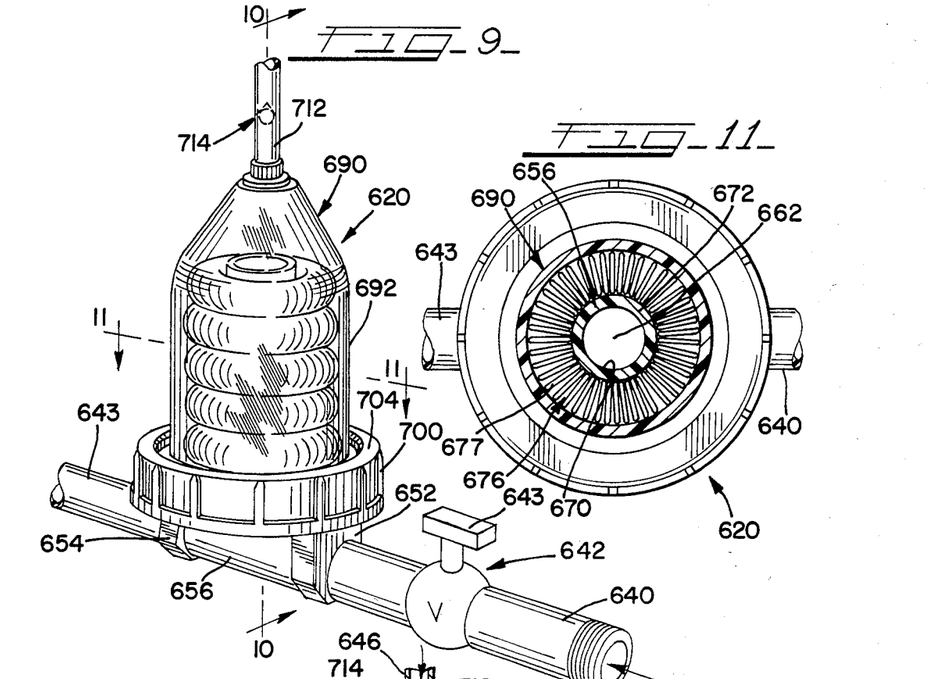
FIG. 9 is a perspective view of another embodiment of the invention.
FIGS. 10 and 11 are diagrammatic sectional views, on an enlarged scale, taken respectively along lines 10—10 and 11—11 of FIG. 9.

The apparatus 310 as diagrammatically illustrated in FIG. 4 is a simplification of the arrangement shown in FIGS. 9 and 10 of said application Ser. No. 403,801 that is adapted specifically for processing of drinking water, or swimming pool water for home pool use, or for use in connection with pools at facilities such as hotels, motels, spas, schools, YMCAs, etc.

The apparatus 310 thus comprises generator 312 comprising cell 313 in the form of cabinet 314 and its cover 316. The cabinet 314 with its cover 316 applied thereto defines gas flow chamber 332 that defines the processing flow way or corridor 336, with the chamber 332 being equipped so that the corridor 336 functions in a manner similar to that of the apparatus described in said applications Ser. No. 363,254 and 403,801. The chamber 332, which is parallelepiped in configuration in the illustrated embodiment, has disposed at its midportion an electron-volt lamp 361 that forms the photolysis device 360 of generator 312 which electron-volt emission lamp 361 is disposed between a magnetic rod device 346A on the back side 317 of the cabinet 314, and a magnetic rod device 346B that is fixed to the back side of the cabinet cover 316 (and is shown only fragmentally). The magnetic rod devices 346A and 346B correspond to the magnetic rod devices 46A and 46B of said application Ser. No. 403,801, and are secured in their illustrated mounted, spaced apart and thus substantially parallel positions, as by employing suitable removable clamp devices 392. The floor 319 of cabinet 314 is formed with a plurality of apertures or ports 320 through which embient air is drawn into chamber 332 by the operation of the apparatus 310, and cabinet 314 is equipped with fitting 400 that serves as the oxidant gas containing gaseous flow outlet from the chamber 332. The filling 400 is suitably connected to diagrammatically illustrated conduiting 402 which is in turn connected to the gas injecting or dispersing device 332 of the present application for diffusing the oxidant gas containing gaseous flow involved into the water to be treated. For purposes of illustration, the device 332 is shown connected to conduit 404 through which a water flow that originates from the body of water to be treated is circulated, and for purposes of disclosure, the conduit 404 may be assumed to represent the water return line of a contaminated water tank installation that conveys the water from the tank for application thereto of the oxidant gas treating agent of the invention of said applications Ser. Nos. 363,254 and 403,801, and returning same back to the tank by way of return conduit 406 with which the device 322 is also connected in the manner diagrammatically illustrated in FIG. 5.

Referring briefly to FIG. 4A, electro-volt lamp 361 is a commercially available product threadedly seated in suitable screw in socket 410 suitably mounted in cap 412 which is threadedly connected to sleeve 414 that is suitably fixed in the aperture 416 formed in the floor 319 of cabinet 314 for this purpose. The socket 410 is suitably electrically connected to conventional lamp ballast 418 received within mounting sleeve 420 that is threadedly connected to the housing sleeve 414 for this purpose, with the sleeve 420 being equipped with suitably threadedly mounted covering cap 422.

Suitable electric onnector 424 is applied to the sleeve 420 and is electrically connected to the ballast 418 for energization of electron-volt lamp 361, from a suitable source of electrical energy, when operation of the apparatus 310 is desired.

The magnet devices 346A and 346 each comprise an elongate container receiving short rod type permanent magnets in longitudinally aligned and alternating polar relation, spaced apart by stainless steel slugs of the same diameter as the magnets. The devices 346A and 346B are the same, except that they are oppositely oriented. Said application Ser. No. 403,801 may be referred to for further details and the permanent magnetic flux patterns that provide that are associated with corridor or way 336 and lamp 361.

When the apparatus 310 is installed and operating, the flow way or corridor 336 of the cabinet 314 functions in a manner similar to the basic arrangements of said applications Ser. Nos. 363,254 and 403,801, with the magnetic rod devices 346A and 346B providing the permanent magnet flux longitudinally and crosswise of the way 366 as required, and the photolysis electron-volt lamp 361 providing the ionizing electron-volt ultraviolet wave length emissions that, in combination, transform the atmospheric oxygen in the air flow through way 336 to the oxygen allotrope ions (in the gaseous state) that have been referred to. As to generator 312, the heat generated by the lamp 361 induces a convection flow of the air flow along way 336, from the atmospheric ambient air source provided by ports or apertures 320, to the fitting 400, which provides for the oxidant gas flow at the fitting 400 as needed for water treatment application to which the output of generator 312 is to be applied. While apparatus 310 of larger capacity models ordinarily may employ a compressor to apply the oxidant gas flow to the device 322 under pressure, in the embodiment of the invention shown in FIGS. 4–8 the gas dispersing or ejecting device 332 avoids the need of the compressor by creating a negative or partial vacuum pressure and drawing the oxidant gas from the fitting 400 through conduiting 302 and effecting its diffusion in the liquid flow passing through the device 332 to conduit 406; the generator 312 may thus involve an electron-volt lamp 361 of 13 watt standard type mercury vapor U-shaped lamp offered by Westinghouse Electric Co. (and a number of other sources) which provides a suction or vacuum induced flow rate from fitting 400 at a level of approximately 0.5 cubic feet per minute.

Referring now more specifically to FIGS. 5–8, the device 332 comprises T-fitting 450, standpipe 452, sleeve 454 (see FIGS. 5–8) in the form of elongate tube 456 defining bore 457, flanged end fitting 458 and nipple type connector fitting 460 that connect the conduiting 404 to the T-fitting 450, and sleeve type end fitting 462 and turbulation device 464 that connect the T-fitting 450 to return conduit 406. Tubular member 456 defines internal surfacing 459 and external surfacing 461.

The T-fitting 450 comprises T-fitting body 470 that is formed to have conventinal T-fitting configuration and thus defines in-line liquid inflow end 472 and in-line liquid outflow end 474, a mounting section or portion 476 that is intermediate ends 472 and 474, with the body 470 defining through same and between its ends 472 and 474 the through passage 478 that defines inflow inlet 480 and outflow outlet 482 at the respective ends 472 and 474 of the fitting 450. The body 470 is internally threaded as at 484 and 486 at the respective ends 472 and 474 of same, with section 476 being shaped to define through passage 486 that intersects with passage 470; the body 470 is internally threaded at 488.

The standpipe 452 comprises tubular body 490 having externally threaded ends or stud portions 492 and 494, respectively. Standpipe 452 in practice is preferably equipped with a convention check valve that in the showing of FIG. 5 is generally indicated by reference numeral 496, with the check valve 496 being diagrammatically illustrated in FIG. 7 in the more specific form following a check valve arrangement made and sold by King Brothers Industries Inc. of Valencia, Calif. under the trademark KING-CHEK, though any other suitable check valve arrangement that would prevent back flow of liquid through standpipe 452 into generator 313 would be satisfactory.

End fitting 458 comprises sleeve member 500 having flange 502 formed at the end 503 of same. Sleeve 500 is externally threaded as at 504 for threaded application to the T-fitting end 472, with the flange 502 of same being hex-shaped for this purpose (see FIG. 6).

The sleeve 500 is also internally threaded as at 506 (see FIG. 5) for threaded application thereto of nipple type fitting 460, which comprises tubular sleeve 510 having its end portions 512 and 514 externally threaded as at 516 and 518 for threaded application to the conduiting 404 and threading 506 of end fitting 458, respectively, in the specific embodiment illustrated.

Nipple 460 is also internally threaded as at 520 for threaded mounting of the tubular member 456 that forms sleeve 454.

The tubular member 456 defines a liquid inflow end 522 that is externally threaded as at 524 for threaded cooperation with the internal threading 520 of nipple 460. Tubular member 456 defines liquid outflow end 526 that is externally threaded as at 528. The liquid flow through tubular member is thus longitudinally of its internal surfacing 459 and with substantially laminar flow characteristics.

Sleeve member 462 is externally threaded as at 530, along its length, in the embodiment illustrated, for threaded application of its gas inflow end 532 to the end 474 of T-fitting 450 and threaded application of its outflow end 534 to turbulation device 464.

The turbulation device 464 comprises a pair of end fittings 540 and 542 that are threadedly connected to generally cylindrical shell 544 to define turbulence chamber 546 from which the fluid flow, comprising the thoroughly mixed liquid and gas, passes into return or discharge pipe 460.

The end fittings 540 and 542 are identical and comprise annular bodies 550 that are externally threaded as at 552 for threaded application to internal threading of sleeve or shelf 544, this component being internally threaded as at 554 and 556, respectively for this purpose. The annular bodies 550 are also internally threaded as at 558 for threaded application to the outflow end 534 of the sleeve 530, and the externally threaded end portion 560 of the discharge or return conduit 406, respectively.

In assembling injector or diffusion device 322 for incorporation in the apparatus 310, the standpipe 452 has its threaded end portion 492 threadedly received in the threading 488 of the T-fitting mounting section 476. In the specific form shown in the drawings, the standpipe body 490 has externally threaded sleeve 562 (see FIG. 7) threadedly mounted in same to form the threaded end portion 492; the check valve 496 comprises externally threaded sleeve 570 that is formed to define stop flange 572 and annular rim portion 574 which seats in socket 576, defined by the body 490, against metallic washer 578, these parts being held in place by a suitable bonding material or adhesive. Sleeve 570 of the commercially available check valve 496 referred to has an integral cross arm 580 that slidably mounts the headed screw member 582, the threaded shank 584 of which has fixed thereto sealing disc 586, that bears the annular seal 588, which is biased against the washer 578 under the biasing action of compression spring 590 interposed between the cross arm 580 and the screw head 582, for check valve type fluid sealing purposes, which biasing action is overcome to open valve 496 when device 322 is functioning to diffuse gas into the water flow through device 322.

The standpipe sleeve 570 is externally threaded as at 584 to threadedly receive the internally threaded coupling member 586 of any conventional type that couples conduiting 402 in leak free relation to standpipe 452.

The tubular member 456 forming sleeve 454 has its inflow end 522 threadedly received within nipple 460, and specifically in its internal threading 524, these components being suitably bonded together in seal tight relation at the threadings 520 and 524. The threaded end 514 of the nipple 460 is threadedly received in the internal threading 506 of end fitting 458, and again suitably bonded in leak free relation thereto. The external threading 504 of sleeve 500 (of fitting 558) is threadedly received within the inflow end 472 of T-fitting 476, with these parts being suitably bonded together in leak free relation at threadings 484 and 504. The end 512 of nipple 460 is threadedly received in the internal threading 513 of the adjacent end 404 of conduiting 402, with bonding again being provided for fluid seal type relationships between the two.

As is clearly shown in FIG. 5, the end fitting 458 as applied to the inflow end 472 of T-fitting 450 disposes the tubular member 456 to project through the T-fitting passage 478 and extend therefrom. The externally threaded sleeve 462 is threadedly applied to the end 474 of the T-fitting 450 in partial telescoping relation to the outflow end 526 of the tubular member 456, but is annularly spaced therefrom thereabout, as indicated in FIG. 5. In the form shown, the outflow end 526 of the tubular member 456 extends to about the mid length portion of the sleeve 462.

It will be observed that with the components of the device 322 as thus far assembled, the tubular member 456 that forms sleeve 454 is connected to the conduit 404 and associated with T-fitting 450 to convey the liquid being treated, namely the water passing through conduit 404, in an essentially laminar flow, completely through the T-fitting 450 and downstream thereof.

The T-fitting passages 478 and 486 define with the tubular member 456 an annular pooling chamber 600 thereabout that extends from the inside end 505 of the end fitting sleeve 500 to the inner end 532 of the threaded sleeve 530, and then thence in reduced annular cross-sectional area for the remaining length of the tubular member 456 across its externally threaded outflow end 526. The tubular member 456 (its external surfacing 461) and sleeve 530 cooperate to define a Venturi throat or orifice 602 with an annular orifice clearance ranging between about 0.010 inch to about 0.030 inch, which has the effect of negative pressure or vacuum drawing or sucking the gas from the conduiting 402 through the standpipe 452 and pooling chamber 60 into a froth flow type interspersement with the liquid discharging from the outflow end 526 of the tubular member 456. There thus occurs at the outflow end 526 of the tubular member 456 and within the end 534 of the threaded sleeve 530 a liquid-gas mixing chamber 604 that effects substantial diffusion or dispersion of the gas within the liquid flow, the swirling motion of which is augmented beneficially by the tendency of the moving gas flow to go into a spiralling motion as it passes through the Venturi orifice due to the presence of the external threading 530 on the tube end 534. This results in rapid and effective dissolving of the gas in the liquid and on a continuous fluid flow basis.

The turbulation device 544 is provided to augment the diffusing, interspersing and dissolving action involved, and with the end fittings 540 and 542 applied to sleeve 544 in fluid tight sealing relation with respect thereto, in the manner indicated in FIG. 5, the end fitting 540 is threadedly received on the threaded end portion 534 of sleeve 530, while the threaded end portion 550 of discharge or return conduit 406 is threadedly applied to end fitting 542 in sealed relation thereto.

The Applicant has found that by having the internal diameter of the chamber 546 at a critical ratio range with the internal diameter of tubular member 456, the turbulation device 464 achieves significant additional hydraulic mixing of the water and gas for complete dispersion and dissolving of the gas within the liquid on a supersaturated basis as it enters discharge or return conduit 406. In accordance with the invention the ratio of the internal diameter or cross sectional area of the chamber 546 to the internal diameter or cross-sectional area of the bore of tube 456 lie in the range of from about 50 to 1 to about 150 to 1, with a ratio of about 100 to 1 being preferred.

The Applicant has further found that the Venturi effect provided by the device 322 is best achieved when the annular pooling area about the tubular member 456 at the location of the internal threadings 484 and 486 of T-fitting 450 (the annular cross-sectional areas) should be of the same, or substantially the same area dimension as the cross-sectional area of the bore of tube 456; this relationship of parts plus the Venturi throat or orifice arrangement provided at the outflow end 526 of tubular member 456, and the extended or projected relation of the outflow end 526 from the downstream end of T-fitting 450, maximizes the injection of the gas flow in an annular manner into the liquid flow in terms of liquid flow rate, and without force mechanical application of the gas to conduiting 402 being required.

As indicated, the injector device 322 avoids the need for having mechanically induced air flow through the conduiting 402 to the liquid flowing between conduits 404 and 406, the gas flow involved being drawn into the liquid flow by the Venturi action at the outflow end of tubular member 456. Device 322 is thus in the nature of an eductor type diffusion device.

It has been found that the gas flow injector device 322 efficiently diffuses the gas flow and the liquid flow at the device 322 even though the pressure differential of the liquid flow at the outflow end of conduit 402 is only about 10 psi greater than the pressure of the liquid at the inflow end of conduit 406. The Venturi orifice or throat provided by the device 322 and the projection of such orifice from the fitting 450 as well as the vacuum drawing action on the gas 360 degrees at the tubular member 456 in the area of the Venturi throat seem to be the key features in providing adequate gas flow to the liquid flow for super saturation dissolving purposes where pressure differentials on the upstream and downstream sides of device 322 may be only in the range of 8 to 12 pounds psi in difference, thereby eliminating the need for compressors or the like to supply atmospheric air into the cabinet chamber 332.

It is preferred that all the component parts illustrated that are not formed of metal be formed of the indicated polyvinyl chloride because that material permits ready shaping of the parts involved and leak free bonding of components together where leak free securement is desired, as by using the aforementioned plumber's solvent. Further, such PVC parts are commercially available in essentially the shaping illustrated for the particular individual components involved, which makes for ready assembly of the device 322 and associated parts in the manner indicated. However, the injector device 322 may be formed of all metallic construction with the component parts involved being suitably integrated together using welding, or other bonding techniques where appropriate.

While the injector device 322 is designed primarily for use in connection with convection or vacuum draw induced air flow through and from the cell 313 or its equivalent, of course compressor action for this purpose may be employed and the water flow through the conduiting 404, the device 322, and conduiting 406 may be of any pressure desired, with the component parts of the device 322 being designed as needed for suitable structural integrity under the circumstances. However, the device 322 is preferred for use in low pressure water flow systems, such as are normally encountered in connection with systems for the purification of water of home drinking water systems, and home swimming pools, and pool facilities of such installations as hotels, motels, schools, YMCAs, or for industrial water reclemation systems and the like. For such installations, which have the invention of this application applied thereto, the conventional water purification arrangement or method may be omitted since the benefits of the inventions as disclosed in applications Ser. Nos. 363,254 and 403,801 will be provided.

The cabinet 314 illustrated is a standard electrical cabinet with removable cover 315, both made from PVC or the like, and offered commercially by Hoffman Engineering Corporation, a Division of Federal Cartridge Corporation, of Anoka, Minn., modified for purposes of the Applicants' invention as indicated, but of course it may be in the form of a custom plastic injection molded product shaped as indicated, if so desired. The magnets of devices 346A and 346B are either the multipolar ceramic magnet product or the rare earth intermediate alloy magnet product commercially available from Indiana General, a division of Electronic Memories and Magnetics Corporation, Valparaiso, Ind. Cover 315 is removably secured in place on cabinet 314 by appropriate screws 321 applied to the respective cabinet walls in holes 323 provided therefor.

Figures 12, 13:
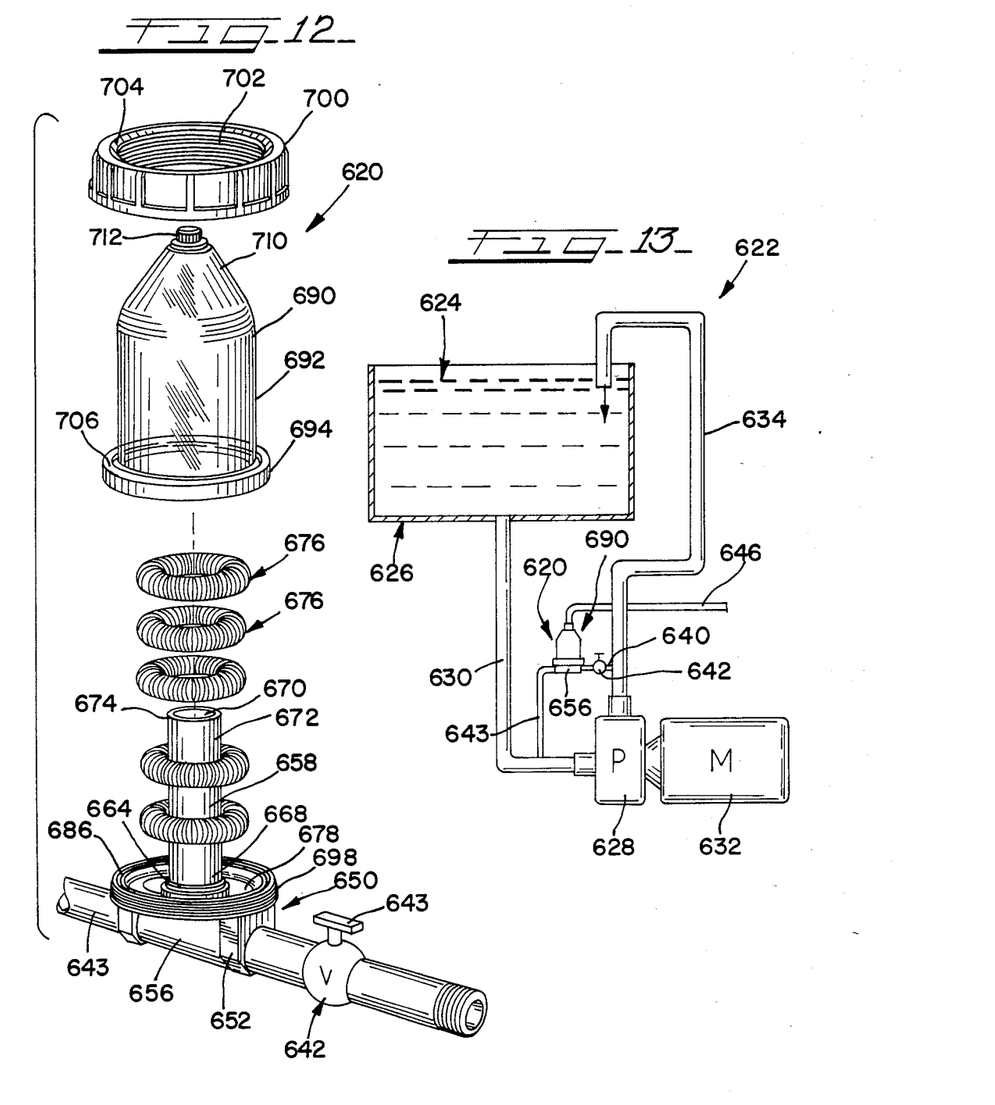
FIG. 12 is an exploded perspective view of the embodiment of FIGS. 9-11.
FIG. 13 a diagrammatic view, partially in vertical section, and largely in block diagram form, illustrating a practical application of the embodiment of FIGS. 9-12.

Referring now to the embodiment of FIGS. 9–13, the gas injection or dispersing device 620 is incorporated in the apparatus 622 that is diagrammatically illustrated in FIG. 13 as arranged for treatment of a body of water 624 contained in a suitable container 626 that is intended to block diagram represent a swimming pool, or spa, or holding tank for industrial-commercial water, in which the water is to be treated for water purification purposes in accordance with the non-chemical methods and apparatus disclosed in said patent applications Ser. No. 403,801 (which has now been replaced by continuation application Ser. No. 599,626, filed Apr. 12, 1984), and Ser. No. 363,254. In accordance with these disclosures, water from the body of water 624 is continuously drawn off from the container 626 as by suitable pump 628 through suction line or conduit 630, with the pump being operated by suitable motor 632. The pump 628, which may be of any suitable type, returns the water to the container 626 through pressure line or conduit 634.

The gas injecting or dispersing device 620 serves a function similar to the device 322, to provide for water treatment or processing for non-chemical disinfection, descaling, detoxification, purification, and related purposes, in which the acting agent involved is gas comprising oxygen allotropes in ionized form, which is obtained by the practice of the invention of said applications Ser. Nos. 363,254, 403,801, and 599,626, as previously described in connection with the dispersing device 322. For the purposes of the water purification system diagrammatically illustrated in FIG. 13, the gas injection or dispersing device 620 is connected to the pressure conduit 634 by inflow conduit 640, in which is operably mounted a suitable type of conventional off-on liquid flow control valve 642. The water having the gas diffused in same is returned from device 620 to the continuously circulating water system involved by outflow conduit 643 that is connected to draw off or suction conduit 630. Device 620 is connected by suitable conduit 646 to a source of the gas to be dispersed or diffused in the water of the system of FIG. 13. Thus, conduit 646 may be suitably connected to conduit 402 of the apparatus 310 (see FIG. 4) in place of the dispersing device 322.

Referring now more specifically to FIGS. 9–12, the device 620 comprises a body 650 of T-fitting configuration defining in-line liquid inflow end 652 and in-line liquid outflow end 654, a mounting section or portion 656 that is intermediate the ends 652 and 654, in association with which is mounted standpipe 658. The body 650 defines inflow passage 660 (see FIG. 10) that makes a right angled turn to substantial alignment with the central axis 662 of the body 650 to define a socket 664 of circular configuration that receives the lower end 668 of the standpipe 658 in substantially complementary fit relation thereto for firm force fit application of the standpipe end 668 within the socket 664 to removably mount the standpipe 658 in upstanding relation to the body 650. Standpipe 658 is of tubular configuration and thus defines bore 670 and encircling side wall 672 that is imperforate, and that is aligned with the portion of the passage 660 that terminates at socket 664 for containing the liquid pressure flow through the length of the standpipe 658 and out of the discharge end 674 of same, which is open for free liquid flow of the liquid therefrom.

The standpipe 658 receives a stack 675 of superposed stainless steel helical wire spring rings 676, with each ring 676 comprising a length 677 of standard helical wire spring having its ends joined together in any suitable manner, so that each ring is a separately continuously helically coiled ring body (each having the same circumference) that is received about the standpipe 658. The rings 676 are preferably in the contacting superposed relation illustrated, or are in closely spaced relation, and preferably are randomly oriented about the central axis 662 of the body 650, which comprises the central axis of the device 620. As indicated, the rings 676 are each of the same circumference (inner and outer diameters), and as applied to standpipe 658, they are tensioned sufficiently to separate somewhat the coils at the internal diameters of each ring 676, so that all the spring coils define between same foramen or interstices through which the fluid flow passes to either side of the spring coils. Thus, the external diameter of the standpipe 658 should exceed the internal diameter of the respective rings 676 somewhat, for instance, a distance on the order of one eighth of an inch.

The body 650 is indented in an annular manner about socket 664, as indicated at 678, to define annular pooling chamber or recess 680 that is in communication with right angled outflow passage 682 (see FIG. 10) that is defined by the body 650, that connects with the outflow line 643, as indicated in FIGS. 9–12.

The body 650 also is formed to define annular groove 684 (see FIG. 10) in which is mounted suitable O-ring seal 686. The device 620 includes cover 690 that defines body portion 692 that is in close fit relation with the stack 675 of rings 676, and is shaped to define annular flange 694 that outwardly extends radially therefrom and forms sealing surface 696 for sealing application against O-ring seal 686. For this purpose, the body 650 is externally threaded as at 698 to receive cap member 700 which is internally threaded at 702 to threadedly engage the body external threading 698, and includes inwardly extending annular flange 704 that bears against annular seat 706 of flange 680, as the cap 700 is turned onto the body 650 to bring the cover flange 694 into firm liquid sealing relation with the O-ring seal 686.

The cover 690 at its upper end 710 is of frustoconical configuration and is suitably connected to the discharge end 712 of the gas flow supply line 646, which preferably includes suitable check valve 714 that is of the same type and serves the same purpose as the check valves 118 and 496.

The cover 690 is preferably formed from a suitable transparent plastic material for visual observation of the gas/liquid flows within same. The off-on valve 642 may be of any suitable conventional valve that is operable to control the flow of liquid to and through the device 620 from zero to full liquid flow rates, as by appropriate manipulation of convenient and conventional handle 643.

The body 650 and cap 700 may be formed from a suitable metallic material, while the stand pipe 658 is formed from the indicated PVC material.

When the off-on valve 642 is in its fully on position (in which its handle 643 parallels inflow conduit 640), and the motor 632 and pump 628 diagrammatically illustrated in FIG. 16 are operating, and preferably continuously for water treating purposes, the non-chemical water treatment of the water in container or tank 626 is effected by the device 620 providing for injection or diffusion in the water flow that passes through the device 620 of the activated oxygen supplied to the device 620 by conduit 646.

Figure 10:
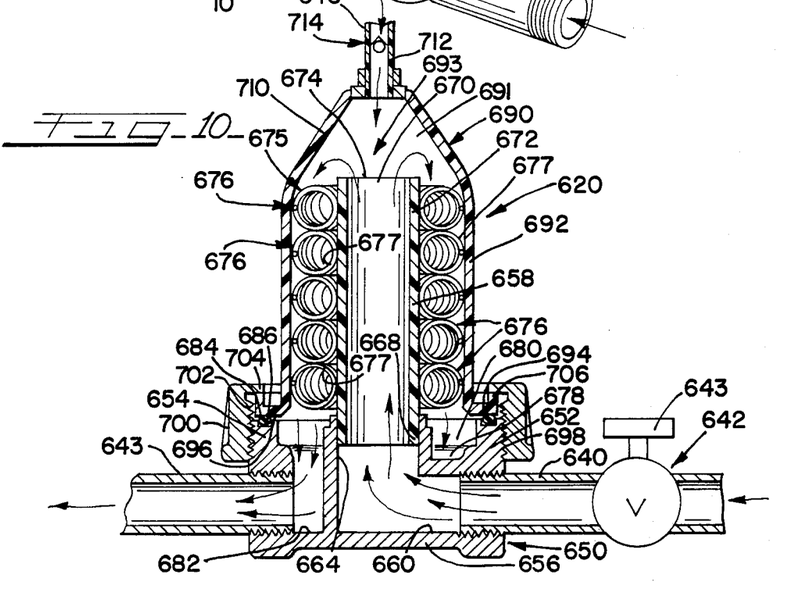

As indicated in FIG. 10, the draw off water flow in which the gas is dispersed is from the pressure conduit 634 and passes through inflow conduit 640 into the body 650 and discharges through passage 660 and the bore 670 of the stand pipe 658 upwardly into the upper portion of the device 620 and its cover 690, whereupon because of the containing of the liquid flow within the device 620, the flow of the liquid reverses direction and passes in an annular flow path exteriorily of the standpipe 658 and back through rings 676 in consecutive manner to the pooling chamber 680 from which the liquid passes through the passage 628 into the outflow line 643, and thence back into draw off line 630 for pumping into the main body of water 624. As long as the system operates continuously, the purifying gas injected into the liquid flow at device 620 is continuously supplied in supersaturated dissolved form for continuous treatment of the body 624 of water involved.

The gas made available to the device 620 by the inflow or supply line 642 is dispersed or diffused in the liquid flow through device 620 by a Venturi action effect that is brought into operation by the manner of liquid flow achieved through the device 620.

More specifically, the motion of the liquid passing through the device 620, and thus its kinetic energy, induces a suction or vacuum action in the upper portion of the gas dispersing chamber 691 formed by cover 690. Assuming that the valve 642 is positioned to permit full flow through conduit 640 to device 620, the liquid flow through device 620 is in the direction indicated by the arrows of FIG. 10, which is thus past valve 642 into passage 660 of fitting 650, and into bore 670 of standpipe 658, from which the liquid discharges at an annular flow 360 degrees about the end 674 of the standpipe 658 and is directed downwardly in a descending annular flow consecutively through the spring units 676, and substantially normally of the coiled wire 677 that forms each spring unit 676. The water flow discharging from standpipe 658 forms a vortex approximately where indicated at 693 in FIG. 10 adjacent the discharge end 674 of the standpipe, and within cover upper end 710, which vortex 693 draws the gas drawn from the source of same through valve 714 into chamber 691 due to the vacuum conditions resulting, with the gas being interspersed in and defused throughout the liquid flow involved, 360 degrees about the exterior of the standpipe 658, with the impinging of the liquid flow and gas on the wire turns of the respective rings 676 effecting a subdividing and mixing action on the gas and liquid flow involved that effects not only complete dispersion and dissolving of the gas within the liquid, but also effects it on a supersaturated basis by the time the liquid flow reaches pooling chamber 680, from which it discharges through passage 682 into outflow conduit 643.

The spring units 676 also effect a debris solids break-up action on the liquid passing through same. The same impinging of the liquid and gas flow on the wire turns of rings 676, moving substantially at right angles or normally through the coil springs subjects any debris involved to a knife edge like break-up action as the particles of same encounter the spring wire obstructions involved, whereby such particles are disintegrated into smaller size debris. Hence blockage of the device 620 by large particle size contaminant debris is avoided by the particle size break down action provided by spring units 676.

It has been found that the gas flow injector or dispersing device 620 efficiently diffuses the gas flow in the liquid flow at the device 620 even though the pressure differential of the liquid flow at the outflow end of the device 620 is only about 10 psi greater than the pressure of the liquid at the inflow end of the device 620. The vacuum drawing action on the gas 360 degrees about the upstanding end of the standpipe 658 and the action of the combination gas and liquid flow on the spring units 676, 360 degrees about the standpipe 658, appear to be the key features of the device 620 in providing adequate gas flow to the liquid flow and dispersion of the gas and the liquid, for supersaturation dissolving purposes where pressure differentials on the upstream and downstream sides of the device 620 may only be in the range of 8 to 12 pounds psi difference, thereby eliminating the need for compressors or the like to supply atmospheric air to the cabinet chamber 332 if this chamber is to serve as the source of gas for the device 620.

While the device 620 is designed primarily for use in connection with convection or vacuum draw induced air flow through and from the cell 313 or its equivalent, of course compressor action for this purpose may be employed; the water flow through the conduiting 630, 634, 640 and 643 may be at any pressures suitable or desired, with the component parts involved, and specifically involved in the device 620, being designed as needed for suitable structural integrity under the circumstances. However, the device 620, like device 322, is preferred for use in low pressure water flow systems, such as are normally encountered in connection with systems for the purification of water of home or domestic drinking water systems, and home swimming pools and swimming pool and spa facilities of such installations as hotels, motels, schools, YMCAs, or industrial water reclamation systems, and the like. For such installations, which have the invention of this application applied thereto, the conventional chemical type water purification arrangement or method may be omitted since the benefits of the inventions disclosed in said applications Ser. Nos. 363,254 and 599,626 will be provided.

The check valves 118, 496 and 714 may be omitted where the installation involved will be free of liquid backflow possibilities.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A device for effecting dispersion of a gas flow into a conduit conveyed liquid flow, said device comprising:
    a T-fitting body having in-line liquid inflow and outflow ends and a mounting section intermediate said ends,
    said body defining intermediate said ends thereof a fluid flow passage extending normally of said ends,
    a standpipe mounted on said body at said section in fluid flow communicating relation to said body passage,
    conduit means for making said standpipe subject to a source of gas to be dispersed into a liquid flow passing through said body ends,
    said body defining a pooling chamber of annular configuration receiving fluid flow from said standpipe,
    said pooling chamber being fluid flow connected to said fitting outlet end,
    said body and said standpipe comprising an assembly for dispersing gas from said source into the liquid flow including Venturi action means for drawing and dispersing the gas in the liquid flow induced by the kinetic energy of the liquid flow through said fitting body,
    check valve means in said conduit means for precluding liquid backflow to the gas source,
    said body defining a second fluid flow passage extending between said ends thereof,
    with the first mentioned passage being in fluid flow communicating relation to said second body passage,
    said conduit means being connected to said standpipe,
    a sleeve defining inner and outer annular side surfacings and being mounted in said fitting body second passage in substantially centered relation thereto and extending longitudinally of said second passage,
    said sleeve defining fluid receiving and discharge ends,
    means for effecting substantially laminar flow of the liquid longitudinally of and along said sleeve internal side surfacing between said ends of same, whereby at said discharge end of said sleeve an annular low pressure fluid homogenizing mixing zone is defined,
    means for conveying the gas flow from the standpipe and said first body passage into annular relation with said sleeve discharge end whereby the gas flow at said sleeve discharge end is sucked into swirling mixing relation with the liquid flow 360 degrees substantially uniformly about said mixing zone,
    said effecting means and said conveying means comprising said Venturi action means,
    said sleeve comprising a tube extending between said ends of said fitting body,
    said tube being anchored to said fitting body adjacent said inflow end of said fitting,
    said tube at said fluid receiving end of same being dammed 360 degrees thereabout between said outer side surfacing thereof and said fitting,
    said standpipe, said fitting body, and said tube defining a gas flow pooling chamber 360 degrees about said tube outer side surfacing,
    said first passage communicating with said pooling chamber,
    a tubular member mounted in said outflow end of said fitting body in substantially concentric relation to said tube, with said tube discharge end projecting into said tubular member in spaced relation thereto and terminating therein,
    said tubular member and said tube discharge end forming an annular Venturi orifice about said tube discharge end through which the gas flow discharges into said mixing zone that comprises said Venturi action means.

2. The device set forth in claim 1 including:
    a tubular housing secured to said fitting body adjacent said outflow end thereof downstream of said mixing zone that receives the fluid flow therefrom,
    said housing defining a hydraulic mixing chamber, said mixing chamber and the bore defined by said tube inner surfacing having a transverse cross-sectional area ratio that lies in the range of from about 50 to 1 to about 150 to 1.

3. The device set forth in claim 2 wherein said ratio approximates 100 to 1.

4. The device set forth in claim 1 wherein:
said pooling chamber and said tube bore defined by said tube inner surfacing having a transverse cross section ratio within said fitting body second passage that has a ratio of approximately one to one.

5. The device set forth in claim 4 wherein:
said tube discharge end is disposed at approximately the midlength portion of said tubular member.

6. A device for effecting dispersion of a gas flow into a conduit conveyed liquid flow, said device comprising:
a T-fitting body having in-line liquid inflow and outflow ends and a mounting section intermediate said ends,
said body defining intermediate said ends thereof a fluid flow passage extending normally of said ends,
a standpipe mounted on said body at said section in fluid flow communicating relation to said body passage,
conduit means for making said standpipe subject to a source of gas to be dispersed into a liquid flow passing through said body ends,
said body defining a pooling chamber of annular comfiguration receiving fluid flow from said standpipe,
said pooling chamber being fluid flow connected to said fitting outlet end,
said body and said standpipe comprising an assembly for dispersing gas from said source into the liquid flow including Venturi action means for drawing and dispersing the gas in the liquid flow induced by the kinetic energy of the liquid flow through said fitting body,
check valve means in said conduit means for precluding liquid backflow to the gas source,
said body defining a second fluid flow passage communicating between said body inflow end and the first mentioned passage,
said pooling chamber being disposed about said standpipe adjacent said mounting section,
said pooling chamber being in fluid flow communication with said body outflow end,
said standpipe having coil spring means mounted thereabout for substantially the length of same that upstands from said body section,
and a cover enclosing said spring means and said standpipe and sealingly secured to said body and about said pooling chamber,
said cover comprising said conduit means and containing the liquid flow within said device,
said standpipe, said spring means, and said cover comprising said Venturi action means,
whereby the liquid flow in said device from said inflow end and said second passage, and through said first passage and said standpipe returns to said pooling chamber annularly about the exterior of said standpipe and through said spring means effects dispersion of said gas into the liquid flow and disintegration of debris particles in the fluids involved.

7. The device set forth in claim 6 wherein:
said rings are randomly oriented about said standpipe.

8. The device set forth in claim 6 wherein:
said spring means comprises a plurality of superposed rings each comprising a separate helical wire coil spring,
with the coils of each of said rings defining a multiplicity of foramen of which the individual foramen are separated by a turn of the spring wire.

9. The device set forth in claim 6 wherein:
said rings resiliently grip said standpipe.

10. The method of dispersing a gas flow into a liquid flow, said method comprising:
continuously passing the liquid under pressure through a confined flow path that consecutively includes a first horizontal inflow section, a second, rectilinear, section that extends vertically and upwardly of said first section, a third reverse direction fluid flow section that is in annular relation about and extends lengthwise and vertically downwardly of said second section, and thence to an annular pooling area section that is in annular communication with said third section, and then into a fourth outflow section,
while exposing the liquid flow at the beginning of its reverse direction of flow to a source of gas drawing the gas into the reverse liquid flow Venturi fashion, and finely subdividing and mixing the liquid and gas components of the fluid flow within said thirds flow section, 360 degrees thereabout, and for substantially the length of same, for effecting complete dispersion and dissolving of the gas within the liquid flow path upstream of said outflow section.

11. The method set forth in claim 10 wherein:
the gas is interspersed in the liquid, and solid particles in the liquid are disintegrated, as the liquid is passed through said reverse direction flow section and into the pooling area section.

12. The method set forth in claim 10 wherein:
the subdividing and mixing of the liquid and gas components of the fluid flow within said third flow section effects said dispersion and dissolving of the gas within the liquid flow path on a supersaturated basis.

13. The method set forth in claim 10, wherein:
the liquid passed onto said flow path contains debris solids,
and such solids are disintegrated by the subdividing and mixing of the liquid and gas components of the fluid flow within said third flow section.

14. A device for effecting dispersion of a gas flow into a liquid flow, said device comprising:
conduit means defining a confined liquid flow path that consecutively includes a first horizontal inflow section, a second, rectilinear, section that extends vertically and upwardly of said first section, a third reverse direction fluid flow section that is in annular relation about and extends lengthwise and vertically downwardly of said second section, an annular pooling area section that is in annular communication with said third section, and a fourth outflow section with which said annular pooling area section is in liquid flow communication,
said conduit means defining a Venturi section overlying and being in fluid flow communication with said second and third sections,
means for exposing a continuous liquid flow through said conduit means, at said Venturi section, to a source of gas for drawing the gas into the reverse liquid flow Venturi fashion, said third section including means for defining foramen 360 degrees thereabout and in stacked relation longitudinally of said third section for finely subdividing and mixing the liquid and gas components of the fluid flow through said third section for effecting complete dispersion and dissolving of the gas within the liquid flow upstream of said outflow section.

15. A device set forth in claim 14 wherein:

said foramen defining means comprises a plurality of coil spring rings disposed in tensioned stacked relation in said third section thereabout and therealong.

* * * * *